US009813299B2

(12) United States Patent
Htay

(10) Patent No.: US 9,813,299 B2
(45) Date of Patent: Nov. 7, 2017

(54) SYSTEMS AND METHODS FOR BANDWIDTH MANAGEMENT IN SOFTWARE DEFINED NETWORKING CONTROLLED MULTI-LAYER NETWORKS

(71) Applicant: Ciena Corporation, Hanover, MD (US)

(72) Inventor: Aung Htay, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 108 days.

(21) Appl. No.: 15/052,094

(22) Filed: Feb. 24, 2016

(65) Prior Publication Data

US 2017/0244606 A1    Aug. 24, 2017

(51) Int. Cl.
H04L 12/24 (2006.01)
H04L 12/801 (2013.01)
H04L 12/851 (2013.01)

(52) U.S. Cl.
CPC ......... H04L 41/0896 (2013.01); H04L 47/11 (2013.01); H04L 47/2433 (2013.01)

(58) Field of Classification Search
CPC ... H04L 41/0896; H04L 47/11; H04L 47/2433
See application file for complete search history.

(56) References Cited

U.S. PATENT DOCUMENTS

| 8,887,991 B2 | 11/2014 | Htay et al. | |
| 2002/0087723 A1* | 7/2002 | Williams | H04L 12/5602 709/240 |
| 2002/0099844 A1* | 7/2002 | Baumann | H04L 47/10 709/232 |
| 2002/0174437 A1* | 11/2002 | Mano | H04L 29/06 725/95 |
| 2006/0088036 A1* | 4/2006 | De Prezzo | H04L 12/465 370/395.53 |
| 2007/0064716 A1* | 3/2007 | Sachs | H04L 47/10 370/412 |
| 2007/0121507 A1* | 5/2007 | Manzalini | H04L 47/10 370/235 |
| 2008/0144661 A1* | 6/2008 | Ali | H04L 41/0816 370/468 |
| 2008/0247314 A1* | 10/2008 | Kim | H04L 41/0816 370/235 |

(Continued)

*Primary Examiner* — Dung B Huynh
(74) *Attorney, Agent, or Firm* — Clements Bernard Walker PLLC; Christopher L. Bernard; Lawrence A. Baratta, Jr.

(57) ABSTRACT

Bandwidth management systems and methods performed in a Software Defined Networking (SDN) controlled network include, responsive to detecting congestion on one or more network services with identifiable data therein, obtaining policy associated with the congested network services and causing bandwidth on demand in the network to mitigate the congestion if the bandwidth on demand is possible in the network and permitted based on the policies of the congested network services; responsive to the congestion remaining subsequent to the bandwidth on demand or if the bandwidth on demand is not possible or permitted, orchestrating bandwidth for the congested network services based on their associated priority in their policy; and, responsive to the congestion remaining subsequent to the orchestrating bandwidth based on priority, orchestrating bandwidth for the congested network services based on an amount remaining to download for each of the congested network services.

20 Claims, 12 Drawing Sheets

(56) References Cited

U.S. PATENT DOCUMENTS

| | | | |
|---|---|---|---|
| 2009/0003209 A1* | 1/2009 | Kalkunte | H04L 47/10 370/232 |
| 2009/0323524 A1* | 12/2009 | Kuhn | H04L 41/5022 370/230 |
| 2010/0319004 A1* | 12/2010 | Hudson | G06F 9/5072 719/313 |
| 2011/0158095 A1* | 6/2011 | Alexander | H04L 47/805 370/232 |
| 2012/0276867 A1* | 11/2012 | McNamee | H04L 12/1407 455/406 |
| 2012/0308231 A1* | 12/2012 | Martinelli | H04J 14/0268 398/45 |
| 2013/0114411 A1* | 5/2013 | Aboul-Magd | H04L 47/2416 370/235 |
| 2014/0177450 A1 | 6/2014 | Chou et al. | |
| 2015/0063800 A1 | 3/2015 | Htay et al. | |
| 2015/0117195 A1* | 4/2015 | Toy | H04L 47/263 370/232 |
| 2015/0127805 A1 | 5/2015 | Htay et al. | |
| 2016/0050470 A1* | 2/2016 | Swinkels | H04Q 11/0062 398/45 |

\* cited by examiner ubuntu:14.04

$ docker pull library/ubuntu@sha256:8844855d30c0cad5ac5809797a9464800102f47364a072c04b7c129087a44b7

- Total Virtual Size: 187.9 MB (187925225 bytes)
- Total v2 Content-Length: 65.7 MB (65747892 bytes)

Layers (4)

f15ce52fc004a5c3eab9128a78f7c0c2135d4f726bc54f1373120ab3ff291bcc

ADD file:7ce20ce3daa6af21dbe24499b4b08b64d15ee060a0a621d0a05bfc720237e84 in /

- Created: Tue, 19 Jan 2016 23:31:14 GMT
- Docker Version: 1.8.3
- Virtual Size: 187.7 MB (187728797 bytes)
- v2 Blob: sha256:8387e9ff0616880a4777e511e55e21672e4b6de40e322b2944b8acbe2ee81d5ed
- v2 Content-Length: 65.7 MB (65675795 bytes)
- v2 Last-Modified: Tue, 19 Jan 2016 22:55:42 GMT c4fae638e7ce5e7eb92b92e6d82e3180e28b85948d362dc52a1c44a720f9b52a

```
RUN echo '#!/bin/sh' > /usr/sbin/policy-rc.d \
    && echo 'exit 101' >> /usr/sbin/policy-rc.d \
    && chmod +x /usr/sbin/policy-rc.d \
        && dpkg-divert --local --rename --add /sbin/initctl \
    && cp -a /usr/sbin/policy-rc.d /sbin/initctl \
    && sed -i 's/^exit.*/exit 0/' /sbin/initctl \
        && echo 'force-unsafe-io' > /etc/dpkg/dpkg.cfg.d/docker-apt-speedup \
        && echo 'DPkg::Post-Invoke { "rm -f /var/cache/apt/archives/*.deb /var/cache/apt/archives/partial/*.d
    && echo 'APT::Update::Post-Invoke { "rm -f /var/cache/apt/archives/*.deb /var/cache/apt/archives/partial/
    && echo 'Dir::Cache::pkgcache ""; Dir::Cache::srcpkgcache "";' >> /etc/apt/apt.conf.d/docker-clean \
        && echo 'Acquire::Languages "none";' > /etc/apt/apt.conf.d/docker-no-languages \
        && echo 'Acquire::GzipIndexes "true"; Acquire::CompressionTypes::Order:: "gz";' > /etc/apt/apt.conf.d
```

- Created: Tue, 19 Jan 2016 23:31:23 GMT
- Parent Layer: f15ce52fc004a5c3eab9128a78f7c0c2135d4f726bc54f1373120ab3ff291bcc
- Docker Version: 1.8.3
- Virtual Size: 194.5 KB (194533 bytes)
- v2 Blob: sha256:3b52deaa4bedb8a82b2a88d0c9e25da2b58a75739b832ecc8e29641b9493ba6
- v2 Content-Length: 71.5 KB (71484 bytes)
- v2 Last-Modified: Wed, 20 Jan 2016 00:56:56 GMT a4c5be5b6e596241b4530ade26294afa8d8a4a2b9163c30e36c87f879b0f5073

FIG. 6A

RUN sed -i 's/^#\s*\(deb.*universe\)$/\1/g' /etc/apt/sources.list

- Created: Tue, 19 Jan 2016 23:31:24 GMT
- Parent Layer: c4faed38c7ca5e7eb92b92e6d82e3180e28b85948d362dc52a1c44a728f9b52a
- Docker Version: 1.8.3
- Virtual Size: 1.9 KB (1895 bytes)
- v2 Blob: sha256:4bd9b1fad6defc3af5838b82f7d780f9dc2f2c5f1bcd2cbfd59607b1831bc679
- v2 Content-Length: 881.0 B
- v2 Last-Modified: Wed, 20 Jan 2016 00:56:53 GMT

8693db7e8a0084b8aacba184cfc4ff9891924ed2270c6dec6a9d99bdcff0d1aa

CMD ["/bin/bash"]

- Created: Tue, 19 Jan 2016 23:31:24 GMT
- Parent Layer: a4c5be5b6e59624 1b4538ade26284afa8d8a4a2b9183c39e38c87f879b8f5073
- Docker Version: 1.8.3
- Virtual Size: 0.0 B
- v2 Blob: sha256:a3ad95caeb02ffe68cdd9fd844060b9ae93d633cb16422d00e8a7c22955b46d4
- v2 Content-Length: 32.0 B
- v2 Last-Modified: Sat, 14 Nov 2015 09:09:44 GMT

FIG. 6B

SYSTEMS AND METHODS FOR BANDWIDTH MANAGEMENT IN SOFTWARE DEFINED NETWORKING CONTROLLED MULTI-LAYER NETWORKS

FIELD OF THE DISCLOSURE

The present disclosure generally relates to networking systems and methods. More particularly, the present disclosure relates to systems and methods for bandwidth management in Software Defined Networking (SDN) controlled multi-layer networks.

BACKGROUND OF THE DISCLOSURE

Software Defined Networking (SDN) is an approach to computer networking that allows network administrators to manage network services through abstraction of higher-level functionality. This is done by decoupling the system that makes decisions about where traffic is sent (the control plane) from the underlying systems that forward traffic to the selected destination (the data plane). In addition to SDN, networks are moving towards the use of Virtualized Network Functions (VNFs) and the like. As part of VNFs, cloud-based networking, and the like, software containers and the like are downloaded over networks. A software container includes an entire runtime environment, namely an application, plus all its dependencies, libraries and other binaries, and configuration files needed to run it, bundled into one package. Conventional techniques for distribution of software containers or other images include downloading an image's layers first and depending on processor resources, downloading the image's layers in parallel, once all layers are downloaded, the layers are extracted (uncompressed), and finally, once all layers are extracted, the image is ready to run. These conventional techniques do not take into account a state of network resources between a container service cloud and image registries. Once there is congestion in the network resources, the parallel downloads are slowed down regardless of the amount of remaining download size.

BRIEF SUMMARY OF THE DISCLOSURE

In an exemplary embodiment, a bandwidth management method performed in a Software Defined Networking (SDN) controlled network includes, responsive to detecting congestion on a network service with identifiable data therein, obtaining policy associated with the congested network service and causing bandwidth on demand in the network to mitigate the congestion when the bandwidth on demand is possible in the network and permitted based on the policy of the congested network service; responsive to the congestion remaining subsequent to the bandwidth on demand or when the bandwidth on demand is not possible or permitted, orchestrating bandwidth for the congested network service based on the associated priority in the policy; and, responsive to the congestion remaining subsequent to the orchestrating bandwidth based on priority, orchestrating bandwidth for the congested network service based on an amount remaining to download for the network service and one or more additional network services. The orchestrating bandwidth for the congested network service based on the associated priority in the policy can include pausing lower priority Service Layer Agreement (SLA) network services in favor of higher priority SLA network services. The orchestrating bandwidth for the congested network service based on the amount remaining to download can include pausing congested network services with greater amounts remaining to download in favor of congested network services with lesser amounts remaining to download.

The bandwidth management method can be performed by a bandwidth management system communicatively coupled to the SDN controller network via an SDN controller. The network service can provide distribution of uniquely identifiable images or software containers between a source and destination location in the network. The network service can provide distribution of uniquely identifiable content between a source and destination location in the network, wherein the uniquely identifiable content is identifiable over the network based on one of a manifest file and a hash signature. The detecting congestion can be responsive to continually monitoring the network and the network service with identifiable data therein.

In an exemplary embodiment, a server adapted to perform bandwidth management associated with a Software Defined Networking (SDN) controlled network includes a network interface communicatively coupled to an SDN controller in the network; a processor communicatively coupled to the network interface; and memory storing instructions that, when executed, cause the processor to, responsive to detection of congestion on a network service with identifiable data therein, obtain policy associated with the congested network service and cause bandwidth on demand in the network to mitigate the congestion when the bandwidth on demand is possible in the network and permitted based on the policy of the congested network service, responsive to the congestion remaining subsequent to the bandwidth on demand or when the bandwidth on demand is not possible or permitted, orchestrate bandwidth for the congested network service based on the associated priority in the policy, and, responsive to the congestion remaining subsequent to the orchestrating bandwidth based on priority, orchestrate bandwidth for the congested network services based on an amount remaining to download for the network service and one or more additional network services The bandwidth can be orchestrated for the congested network services based on the associated priority in the policy can include a pause for lower priority Service Layer Agreement (SLA) network services in favor of higher priority SLA network services. The bandwidth can be orchestrated for the congested network service based on the amount remaining to download can include a pause of congested network services with greater amounts remaining to download in favor of congested network services with lesser amounts remaining to download. The server can be part of a bandwidth management system communicatively coupled to the SDN controlled network via an SDN controller. The network service can provide distribution of uniquely identifiable images or software containers between a source and destination location in the network. The network service can provide distribution of uniquely identifiable content between a source and destination location in the network, wherein the uniquely identifiable content is identifiable over the network based on one of a manifest file and a hash signature. The congestion can be detected responsive to continual monitor of the network and the network service with identifiable data therein.

In a further exemplary embodiment, a bandwidth management system communicatively coupled to a Software Defined Networking (SDN) controlled network includes a data collector system adapted to obtain data from the SDN controlled network and one or more data sources; a container runtime analyzer adapted to identify uniquely identifiable content downloaded between two points including source and destination locations in the network and to monitor for congestion associated therewith; and a bandwidth orchestrator adapted to cause orchestration to mitigate congestion marked by the container runtime analyzer, wherein the orchestration includes additional bandwidth including bandwidth on demand, prioritization of network services based on Service Layer Agreement (SLA) policy, and prioritization of network services based on remaining amounts to be downloaded.

The prioritization of network services based on the SLA policy can include a pause of lower priority SLA services in favor of higher priority SLA network services, and wherein the prioritization of network services based on remaining amounts to be downloaded can include a pause of congested network services with greater amounts remaining to download in favor of congested network services with lesser amounts remaining to download. The data collector system can be communicatively coupled to the SDN controller network via an SDN controller. The network services can provide distribution of uniquely identifiable images or software containers between a source and destination location in the network. The network services can provide distribution of uniquely identifiable content between a source and destination location in the network, wherein the uniquely identifiable content is identifiable over the network based on one of a manifest file and a hash signature. The container runtime analyzer can be adapted to monitor continually the network and the network services with identifiable data therein to detect the congestion.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 6A and 6B are an exemplary manifest file for a software container;

DETAILED DESCRIPTION OF THE DISCLOSURE

Again, in various exemplary embodiments, the present disclosure relates to systems and methods for bandwidth management in Software Defined Networking (SDN) controlled multi-layer networks. The systems and method orchestrate dynamic bandwidth management in an SDN-controlled network. Organizations are moving to micro-services and continuous delivery as a way of delivering software to end users. In a micro-services architecture, an application is built using a combination of loosely coupled and service-specific software containers and images. The image management can be viewed as the Content Distribution Network (CDN) with the storage backend. The CDN is moving to the manifest driven, content addressable and overlay process of consuming network resources. This approach is particularly important when downloading software images and streaming High Definition (HD) video (e.g., 4K/8K) content. The orchestration systems and methods provide dynamic bandwidth allocation as an actionable response to data analytics on the container runtime data and network resources data. The orchestration systems and methods control container runtime daemon processes to achieve the most effective image download and extraction.

SDN Network

Figure 1:
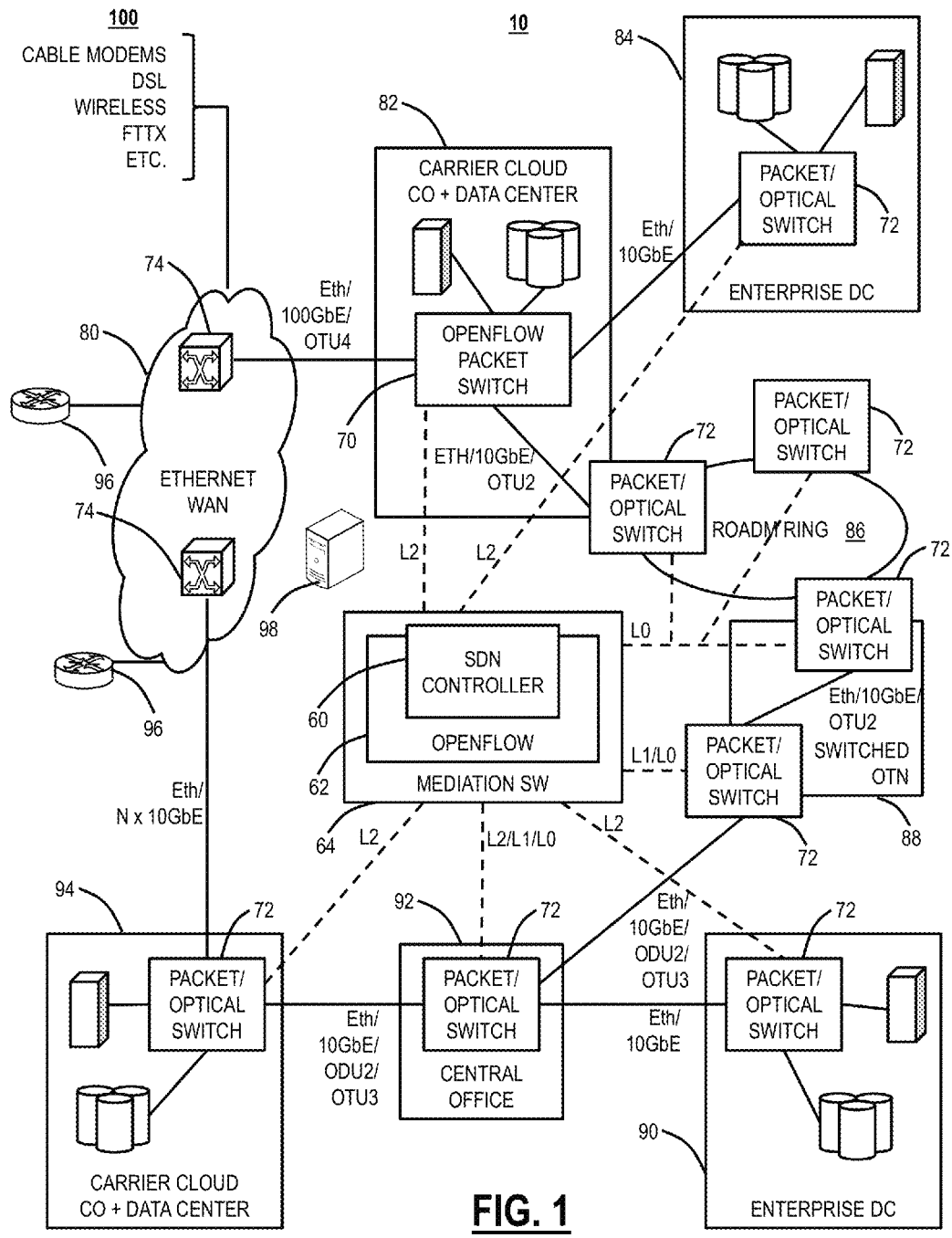
FIG. 1 is a network diagram of an exemplary network for describing the SDN bandwidth management systems and methods.

Referring to FIG. 1, in an exemplary embodiment, a network diagram illustrates an exemplary network 10 for describing the systems and methods. Those of ordinary skill in the art will recognize that any network configuration is contemplated with the systems and methods, and the network 10 is merely presented for illustration. The network 10 is an SDN network, which includes an SDN controller 60 with the ability to (logically) centrally program provisioning of forwarding in the network 10 in order for more flexible and precise control over network resources to support new services. Application Programmable Interfaces (APIs) provide programmatic communication between an SDN controller and either (i) specific applications or (ii) programmable network devices such as communication over Transaction Language-1 (TL-1) or Common Object Request Broker Architecture (CORBA) calls. OpenFlow (www.openflow.org) is an example implementation of a special OpenFlow interface 62 from the SDN controller 60 to programmable network devices. It may or may not communicate via mediation software 64, to each switch 70, 72, 74 in the network 10 in order to provision the forwarding table at each switch along a connection path in order to instantiate the forwarding behavior needed for the connection. OpenFlow is described, for example, in the OpenFlow Switch Speciation, Version 1.1.0 (February 2011)—Version 1.5.0 (December 2014), the contents of which are incorporated by reference herein. While OpenFlow describes one version of an SDN interface, other SDN protocols besides OpenFlow (such as Netflow, REST, etc.) are also contemplated with the systems and methods described herein.

Again, for illustration purposes, the network 10 includes an OpenFlow-controlled packet switch 70, various packet/optical switches 72, and packet switches 74 with the switches 70, 72 each communicatively coupled to the SDN controller 60 via the OpenFlow interface 62 and the mediation software 64 at any of Layers 0-3 (L0 being DWDM, L1 being OTN, and L2 being Ethernet). The switches 70, 72, 74, again for illustration purposes only, are located at various sites, including an Ethernet Wide Area Network (WAN) 80, a carrier cloud Central Office (CO) and data center 82, an enterprise data center 84, a Reconfigurable Optical Add/Drop Multiplexer (ROADM) ring 86, a switched OTN site 88, another enterprise data center 90, a central office 92, and another carrier cloud Central Office (CO) and data center 94. The network 10 can also include IP routers 96 and a network management system (NMS) 98. Note, there can be more than one of the NMS 98, e.g., an NMS for each type of equipment—communicatively coupled to the SDN controller 60. Again, the network 10 is shown just to provide context and typical configurations at Layers 0-3 in an SDN network for illustration purposes. Those of ordinary skill in the art will recognize various other network configurations are possible at Layers 0-3 in the SDN network.

The switches 70, 72, 74 can operate, via SDN, at Layers 0-3. The OpenFlow packet switch 70, for example, can be a large-scale Layer 2 Ethernet switch that operates, via the SDN controller 60, at Layer 2 (L2). The packet/optical switches 72 can operate at any of Layers 0-3 in combination. At Layer 0, the packet/optical switches 72 can provide wavelength connectivity such as via DWDM, ROADMs, etc., at Layer 1, the packet/optical switches 72 can provide time division multiplexing (TDM) layer connectivity such as via Optical Transport Network (OTN), Synchronous Optical Network (SONET), Synchronous Digital Hierarchy (SDH), etc., at Layer 2, the packet/optical switches 72 can provide Ethernet or Multi-Protocol Label Switching (MPLS) packet switching and at Layer 3 the packet/optical switches can provide IP packet forwarding. The packet switches 74 can be traditional Ethernet switches that are not controlled by the SDN controller 60. The network 10 can include various access technologies 100, such as, without limitation, cable modems, digital subscriber loop (DSL), wireless, fiber-to-the-X (e.g., home, premises, curb, etc.), and the like. In an exemplary embodiment, the network 10 is a multi-vendor (i.e., different vendors for the various components) and multi-layer network (i.e., Layers L0-L3).

Figure 2:
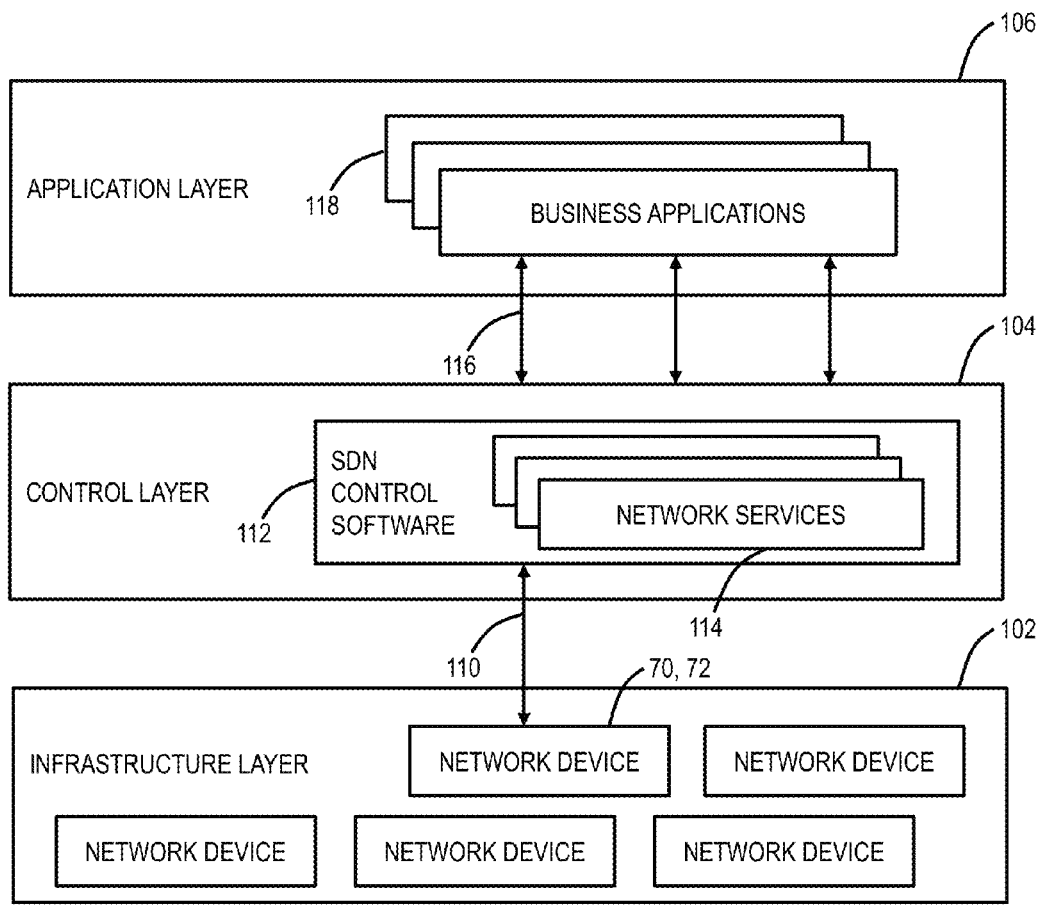
FIG. 2 is a block diagram of functional components of an SDN environment.
Figure 3:
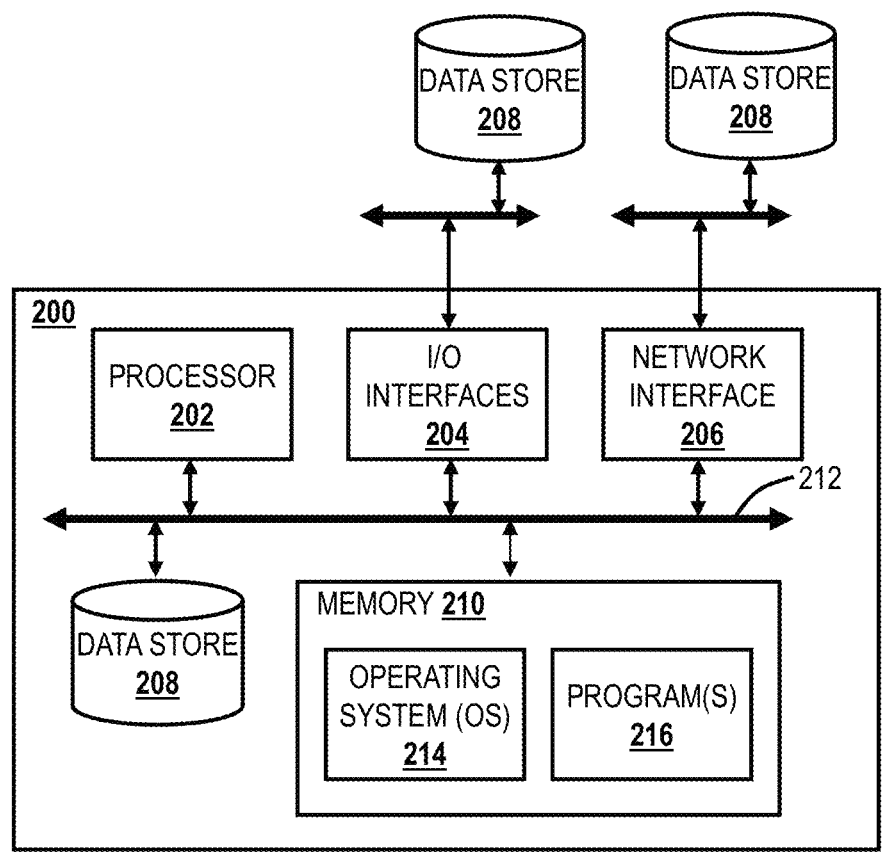
FIG. 3 is a block diagram of a server which may be used to realize the SDN controller, the business applications, and/or other systems.

Referring to FIG. 2, in an exemplary embodiment, a block diagram illustrates functional components of an SDN environment 50. The SDN environment 50 layers 104, 106 can be implemented on one or more servers, such as illustrated in FIG. 3 and the layers 104, 106 can be through functional components implemented in software executed on the server. The SDN environment 50 includes a programmable infrastructure layer 102, a control layer 104, and an application layer 106. The programmable infrastructure layer 102 includes network devices such as the switches 70, 72 and the like. The programmable infrastructure layer 102 is communicatively coupled to the control layer 104 via a control plane interface 110 such as OpenFlow, for example. The control layer 104 facilitates communication between the application layer 106 and the network devices 70, 72 located in programmable infrastructure layer 102. The control layer 104 includes SDN control software 112 with a plurality of network services 114. The control layer 104 provides SDN functionality to manage network services through abstraction of lower level functionality. The application layer 106 communicates with the control layer 104 through various Application Programming Interfaces (APIs) 116. The application layer 106 provides end user connectivity to the SDN such as software modules and/or functions responsible for creating the desired path and flow connections on the physical network through various business applications 118. In an exemplary embodiment, the systems and methods described herein are implemented as one of the business applications 118 on the SDN controller 60 and/or on a separate server 200.

Exemplary Server

Referring to FIG. 3, in an exemplary embodiment, a block diagram illustrates a server 200 which may be used to realize the SDN controller 60, the business applications 118, and/or other systems. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and practical embodiments may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. The system output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate over a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Orchestration Platform

Figure 4:
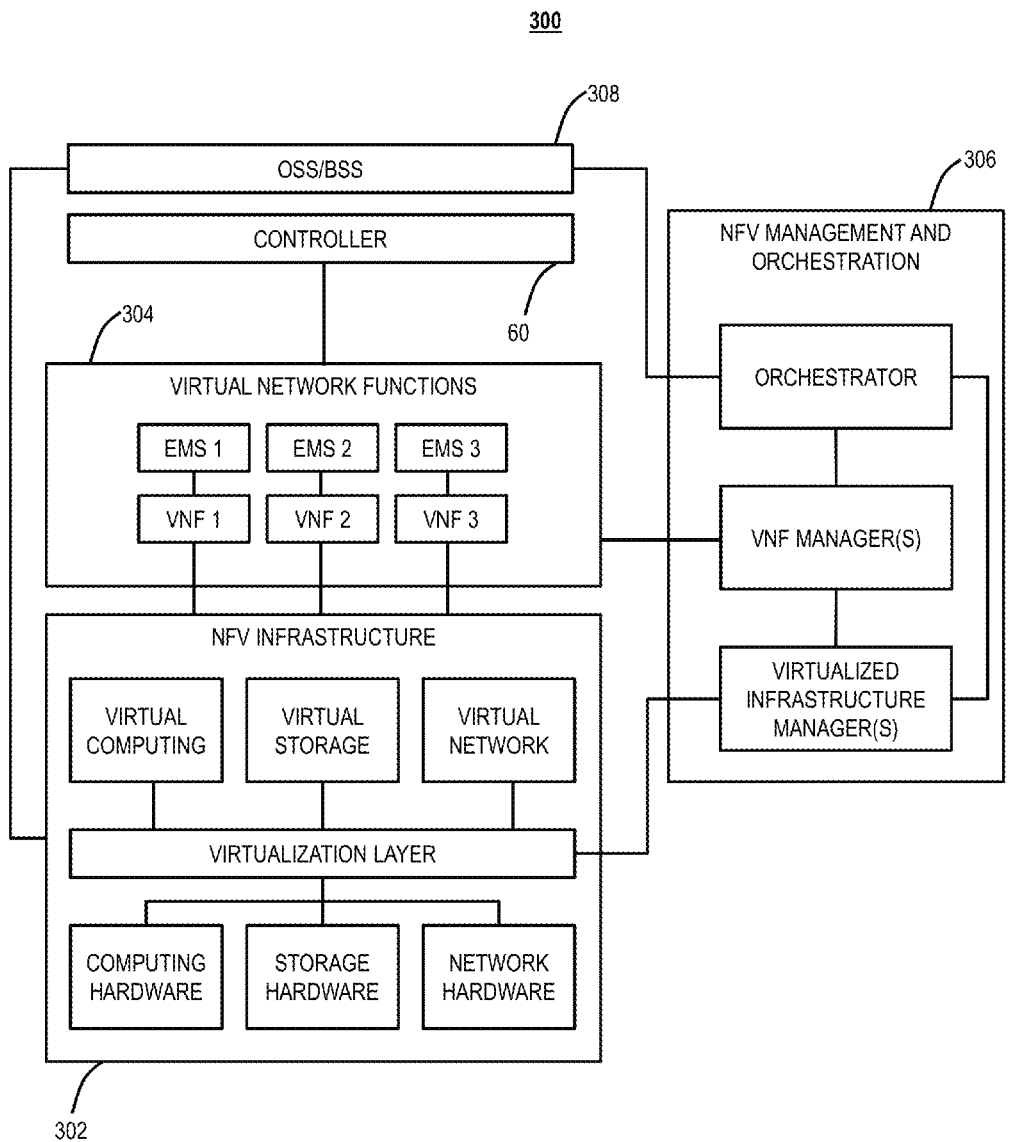
FIG. 4 is a block diagram of an orchestration system.

Referring to FIG. 4, in an exemplary embodiment, a block diagram illustrates an orchestration system 300. The orchestration system 300 can communicate over the network 10. In an exemplary embodiment, the orchestration system 300 can provide distribution of images, containers, etc. over the network 10 along with the bandwidth management systems and methods. The orchestration system 300 can provide a container-based micro-services software architecture that incorporates advanced modeling, templating, and orchestration methodologies to provide a scalable, vendor-agnostic, highly programmable software platform. This modular and extensible approach enables network operators to automate the lifecycle of differentiated new services that can be deployed across multi-vendor and multi-domain environments and scaled on demand. The orchestration system 300 can include Network Functions Virtualization (NFV) infrastructure 302, Virtual Network Functions (VNF) 304, NFV management and orchestration 306, an Operations Support System (OSS)/Business Support System (BSS) 308, and the controller 60.

Dynamic Bandwidth Management Orchestration in SDN System

Figure 5:
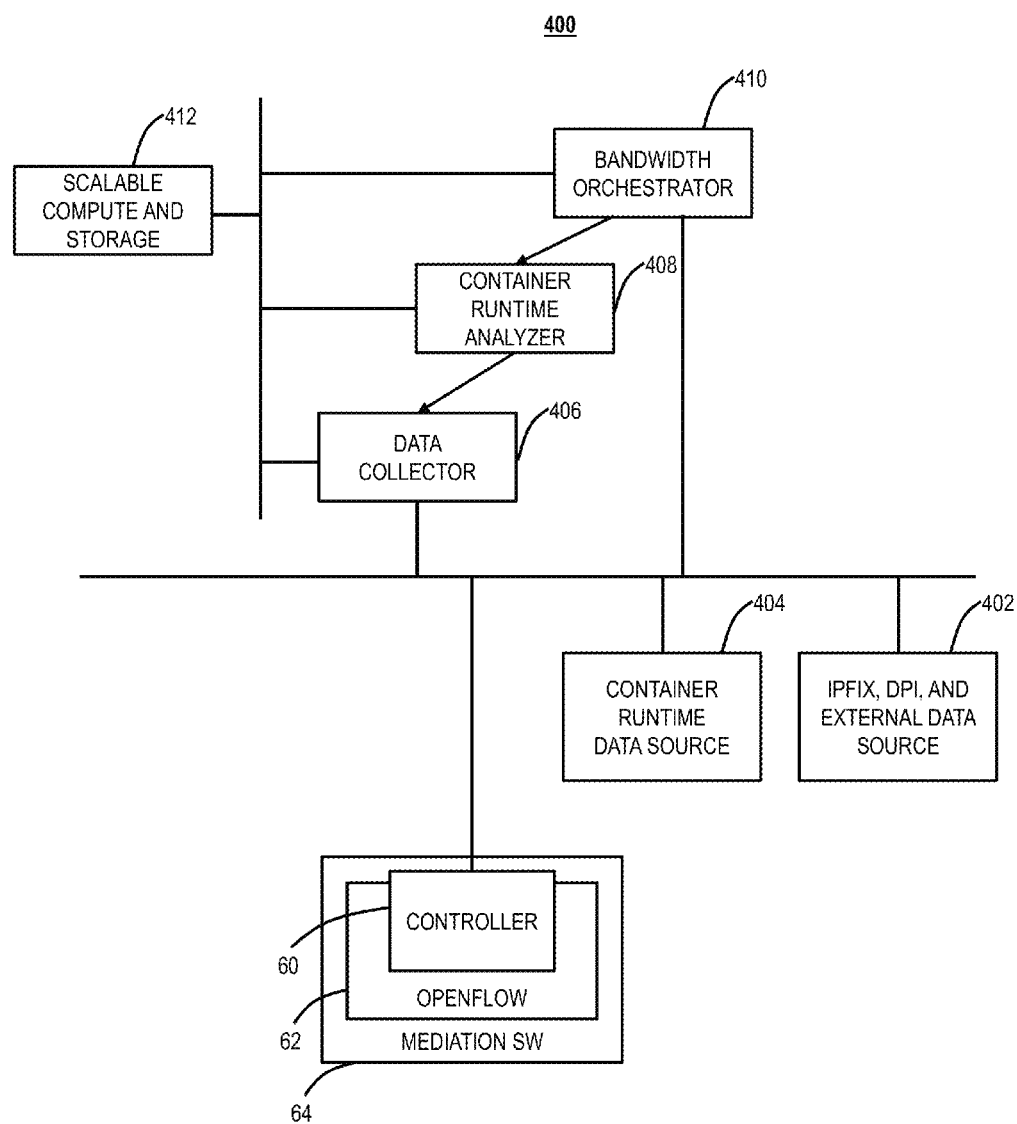
FIG. 5 is a block diagram of functional components of a bandwidth management orchestration system.

Referring to FIG. 5, in an exemplary embodiment, a block diagram illustrates functional components in a bandwidth management orchestration system 400. The functional components in the bandwidth management orchestration system 400 can be implemented in hardware and/or software executable on hardware. The bandwidth management orchestration system 400 is communicatively coupled to the controller 60 in the network 10 (or to some other SDN interface in an SDN-controlled network). The bandwidth management orchestration system 400 includes one or more data sources 402, a container runtime data source 404, a data collector 406, a container runtime analyzer 408, a bandwidth orchestrator 410, and scalable compute and storage 412. The data sources 402 can include Internet Protocol Flow Information eXport (IPFIX) data sources. IPFIX data can be sent by devices in the network 10 such as routers and switches to the data collector 406 and stored in the scalable storage 412. The devices in the network 10 can be physical and/or VNFs and can be located in enterprise premise, public/private cloud, etc. The data sources 402 can include Deep Packet Inspection (DPI) data sources. Also, the DPI data can be sent to the data collector 406, stored in the scalable storage 412, and the DPI data can be from physical devices and/or VNFs. The container runtime data source 404 can include data related to images, containers, etc. distributed over the network 10. Again, the network 10 can be a multi-layer network with the controller 60. The bandwidth management orchestration system 400 can be implemented by the data collector 406, the container runtime analyzer 408 and the bandwidth orchestrator 410 which are executed on one or more servers 200, such as running on top of the scalable compute and storage 412.

The bandwidth management orchestration system 400 is configured to determine which images, containers, etc. are being distributed over the network 10. This is done through manifest files and associated data, processed by the container runtime analyzer 408 and stored in the scalable storage 412. A manifest file in computing is a file containing metadata for a group of accompanying files that are part of a set or coherent unit. For example, the files of a computer program may have a manifest describing the name, version number, and the constituting files of the program. In an exemplary embodiment, manifest files are obtained in a JavaScript Object Notation (JSON) format for processing by the container runtime analyzer 408.

For example, consider an Ubuntu 14.04 image from the public registry (hosted by Docker.io). The content of a software image is described in a manifest. The Ubuntu 14.04 image is composed of four (4) layers. The manifest of the Ubuntu 14.04 image contains information about the download size of each layer as shown in FIGS. 6A and 6B.

For example, when an organization or user wants to run this software image (Ubuntu 14.04) in a container hosted by a cloud provider (e.g., Amazon's Elastic Compute Cloud (EC2) container service), the image has to be first downloaded by a container daemon process to the cloud data center. The daemon can perform the parallel download of all the four layers. When all the layers are downloaded, they are extracted locally and ready to be run. Note, the daemon has no knowledge of the condition of network resources between the cloud data center and the registry, in the network 10.

Consider another organization, within the same cloud data center, is deploying a VNF software image. The container runtime daemon performs another set of parallel downloads of the layers. Note, again the daemon has no knowledge of the condition of network resource between the cloud data center and the registry, in the network 10. In a typical container service, like Amazon's EC2 container service, there will be many instances of parallel downloads by the daemons. When there is congestion in the network resources, these parallel downloads are slowed down. A software image can only be run when all the layers are fully downloaded and extracted.

Dynamic Bandwidth Management Orchestration Process

Figure 7:
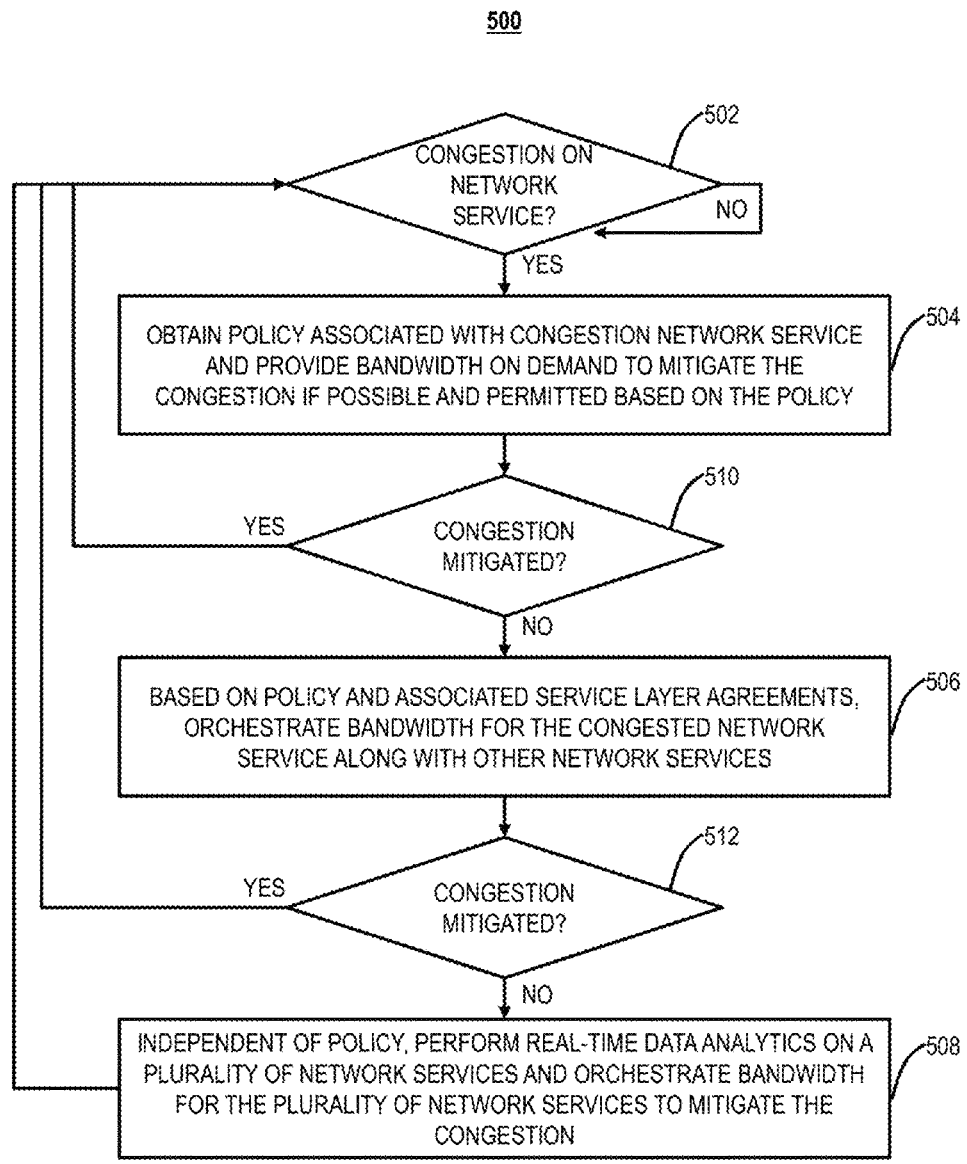
FIG. 7 is a flowchart of a dynamic bandwidth management orchestration process, implementable in the network of FIG. 1.

Referring to FIG. 7, in an exemplary embodiment, a flowchart illustrates a dynamic bandwidth management orchestration process 500, implementable in the network 10. Specifically, the dynamic bandwidth management orchestration process 500 addresses network congestion in the network 10 when distributing images, software containers, or any other data which can be uniquely tracked when distributed through the network 10. The dynamic bandwidth management orchestration process 500 can be implemented in the controller 60, through the business applications 118, and/or through the bandwidth management orchestration system 400.

The bandwidth management orchestration process 500 is implemented with respect to the distribution of identifiable data over the network when there is network congestion. The bandwidth management orchestration process 500 can be implemented when a network service encounters congestion in the network 10 (step 502). The distribution process is an exemplary network service, i.e., a congested network service detected in step 502. Further, the network service can include transmission of any data (e.g., images, software containers, etc.) that is uniquely tracked when distributed through the network 10. The unique tracking can be through a manifest file, cryptographic hash functions (e.g., Secure Hash Algorithm (SHA)), and the like. For example, SHA-256 generates an effectively-unique, fixed-size 256-bit (32-byte) hash that can uniquely identify data over the network 10. Such unique identifiers can be stored in the container runtime data source 404 and detected over the network 10 by the container runtime analyzer 408, with data provided from the data collector 406.

The process 500 generally includes three steps 504, 506, 508 which each includes higher levels of orchestration to mitigate the congestion. If each step 504, 506, 508 succeeds, the process 500 ends (back to step 502), and if not, the process 500 proceeds to a next step. After detecting network congestion, the process 500 includes obtaining policy associated with congested network service and providing bandwidth on demand to mitigate the congestion if possible and permitted based on the policy (step 504). A policy file can be retrieved for the congested network service. The policy file can be located in one of the data sources 402, 404 and includes business and service preferences. The policy for the congested network service dictates whether or not the process 500 can utilize the step 504. That is, the policy can include whether or not it is possible to provide bandwidth on demand to address the congested network service. When permitted based on the policy and when there are network resources available for dynamic bandwidth allocation, step 504 can include the bandwidth orchestrator 410 utilizing the SDN controllers 60 to perform bandwidth on demand to mitigate the congestion.

If step 504 mitigates congestion, the process 500 returns to step 502 (step 510); else, the process 500 proceeds to step 506. The process 500 includes, based on policy and associated service layer agreements, orchestrating bandwidth for the congested network service along with other network services (step 506). When there are no resources available for dynamic bandwidth allocation or if it is not permitted based on policy, the container runtime analyzer 408 can get the policy files associated with the container runtime systems, i.e., the network service. The policy file can include the Service Level Agreement (SLA) for the container runtime system. For example, each network service that is uniquely identifiable can be associated with a container runtime system. The container runtime analyzer 408 can provide the SLA information to the bandwidth orchestrator 410. The bandwidth orchestrator 410 orchestrates daemons associated with the network service and other network services, according to the SLAs. The daemons are computing processes responsible for the network services. For example, the highest SLA daemon can continue with downloads while other, lower SLA daemons are instructed to suspend their downloads. As such, the SLA preferences can be used to mitigate network congestion.

If step 506 mitigates congestion, the process 500 returns to step 502 (step 512); else, the process 500 proceeds to step 508. The process 500 include, independent of policy, performing real-time data analytics on a plurality of network services and orchestrate bandwidth for the plurality of network services to mitigate the congestion (step 508).

When there are no network resources available for dynamic allocation and no policies are specified for the container runtime systems, the container runtime analyzer 408 performs real-time data analytics on the states of all the images (network services). For example, the container runtime analyzer 408 can order the image manifests according to the amount of data left to be downloaded.

For example, assume the Ubuntu 14.04 image has about 12 Mb left to be downloaded by a daemon #1. Whereas the VNF software image has more than 168 Mb left to be downloaded by a daemon #2. The container runtime analyzer 408 provides the result of analytics to the bandwidth orchestrator 410. The bandwidth orchestrator 410 orchestrates the daemons to either continue the download of the image layers or to suspend the download. In this example, the bandwidth orchestrator 410 instructs the daemon #1 to continue the download and instructs the daemon #2 to pause the download, based on analysis. Instead the bandwidth orchestrator 410 instructs the daemon #2 to start extracting all the layers that are already downloaded. When the daemon #1 completes the image download, the bandwidth orchestrator 410 instructs the daemon #2 to resume the suspended downloads. The outcome of the orchestration through the process 500 is to get the most effective completion of image download and extraction.

Container Runtime Analyzer Process

Figure 8:
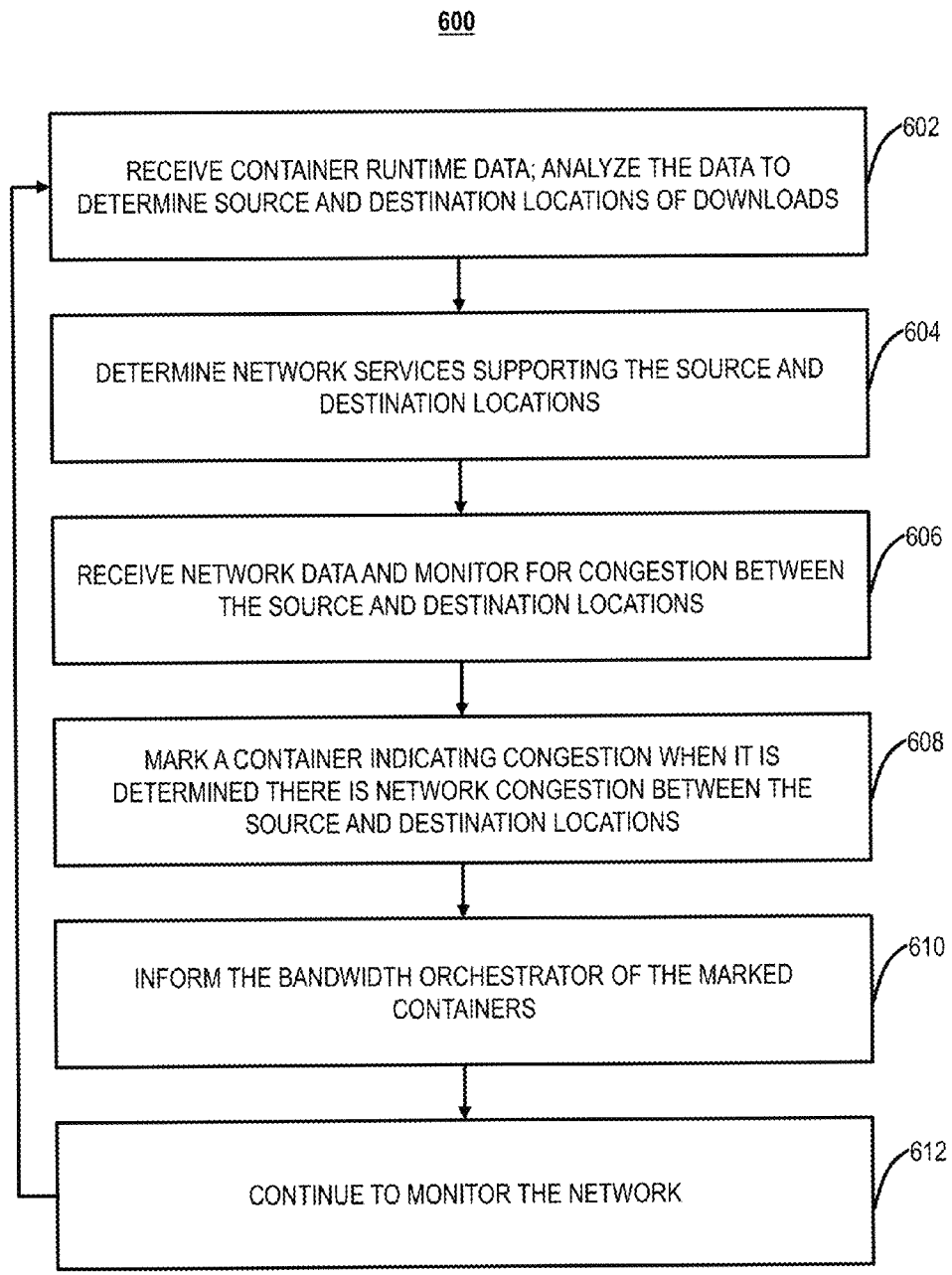
FIG. 8 is a flowchart of a container runtime analyzer process, which may be implemented by the container runtime analyzer in the bandwidth management orchestration system of FIG. 5.

Referring to FIG. 8, in an exemplary embodiment, a flowchart illustrates a container runtime analyzer process 600, which may be implemented by the container runtime analyzer 408 in the bandwidth management orchestration system 400. The process 600 describes the functionality of the container runtime analyzer 408, which may include identifying specific image or software container downloads, between source and destination locations in the network 10, and monitoring for associated congestion. The process 600 includes receiving container runtime data, and analyzing the data to determine source and destination locations of downloads (step 602); determining network services supporting the source and destination locations (step 604); receiving network data and monitor for congestion between the source and destination locations (step 606); marking a container indicating congestion when it is determined there is network congestion between the source and destination locations (step 608); informing the bandwidth orchestrator 410 of the marked containers (step 610); and continuing to monitor the network 10 (step 612). That is, the container runtime analyzer 408 generally identifies image or software container downloads, between source and destination locations in the network 10, and monitors the network 10 to determine if any associated network service is congested.

Bandwidth Orchestrator Process

Figure 9:
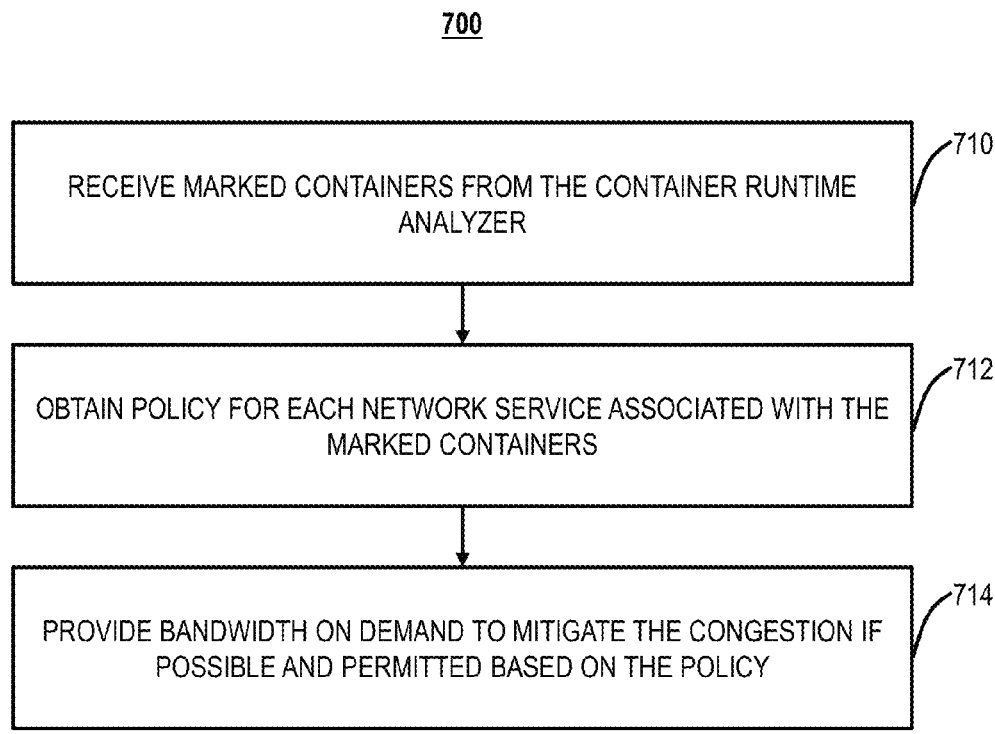
FIGS. 9, 10, and 11 are flowcharts of bandwidth orchestrator processes that correspond to steps in the process dynamic bandwidth management orchestration process of FIG. 7.
Figure 10:
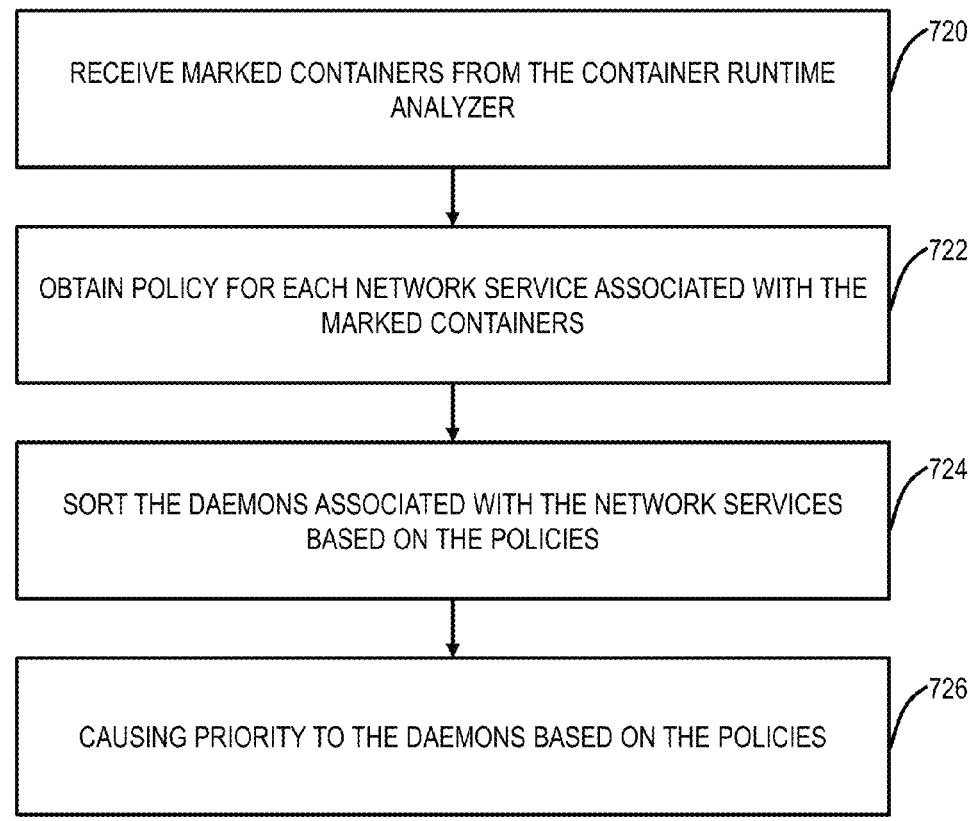
Figure 11:
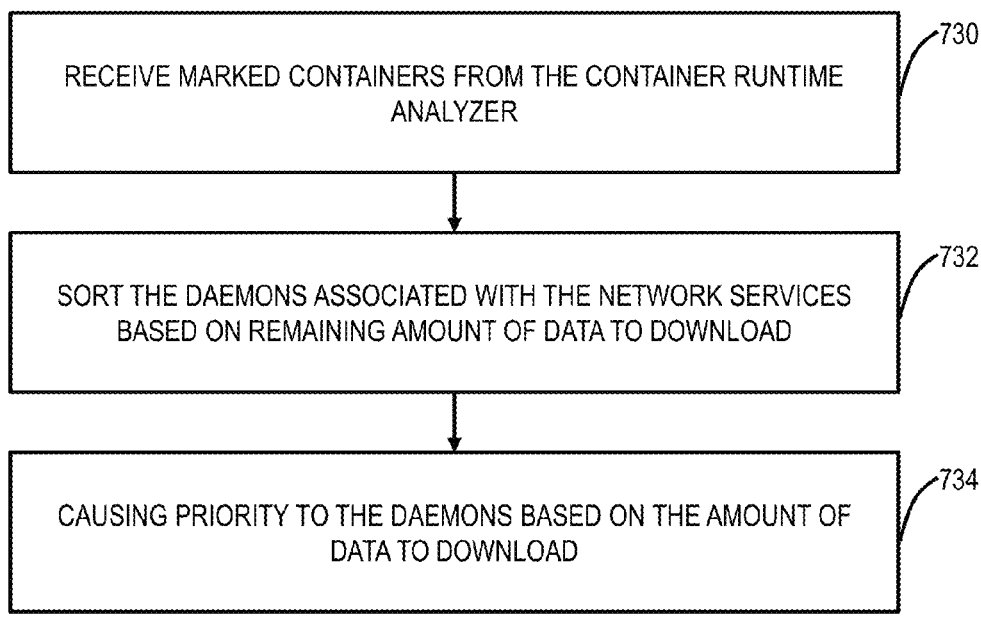

Referring to FIGS. 9, 10, and 11, in various exemplary embodiments, flowcharts illustrate bandwidth orchestrator processes 700, 702, 704 that correspond to steps 504, 506, 508 in the process 500. The bandwidth orchestrator processes 700, 702, 704 illustrate the functionality of the bandwidth orchestrator 410 in the bandwidth management orchestration system 400. Note, the bandwidth orchestrator 410 performs different functionality for each of steps 504, 506, 508.

In FIG. 9, the process 700 corresponds to step 504. The process 700 includes receiving marked containers from the container runtime analyzer 408 (step 710); obtaining a policy for each network service associated with the marked containers (step 712); and providing bandwidth on demand to mitigate the congestion if possible and permitted based on the policy (step 714). The marked containers can be received from the container runtime analyzer 408 performing the process 600. The bandwidth on demand can include dynamic bandwidth allocation in the network 10.

In FIG. 10, the process 702 corresponds to step 506. The process 702 includes receiving marked containers from the container runtime analyzer 408 (step 720); obtaining policy for each network service associated with the marked containers (step 722); sorting the daemons associated with the network services based on the policies (step 724); and causing priority to the daemons based on the policies (step 726). For example, the policies can be SLAs. Assume three daemons—Daemon #1: Bronze SLA, Daemon #2: Gold SLA, and Daemon #3: Silver SLA. Here, the bandwidth orchestrator 410 can give Daemon #2 priority over the other Daemons for the download of the layers regardless of the remaining amount to be downloaded.

In FIG. 11, the process 704 corresponds to step 508. The process 704 includes receiving marked containers from the container runtime analyzer 408 (step 730); sorting the daemons associated with the network services based on remaining amount of data to download (step 732); and causing priority to the daemons based on the amount of data to download (step 734). Again, assume three daemons and the following remaining amount to be downloaded. Daemon #1: 11.87 MB, Daemon #2: 168.713 MB, and Daemon #3: 208.295 MB. Here, the bandwidth orchestrator 410 instructs Daemon #1 to continue the download of the layers. The bandwidth orchestrator 410 instructs Daemon #2 and #3 to suspend the download of their respective layers. The bandwidth orchestrator 410 also instructs the Daemon #2 and #3 to extract their respective downloaded layers. Once the Daemon #1 completes the download, the bandwidth orchestrator 410 instructs the Daemon #2 to resume the download of its layers. The Daemon #1 can continue with the extraction of the downloaded layers. Once the Daemon #2 completes the download, the bandwidth orchestrator 410 instructs the Daemon #3 to resume the download. The Daemon #2 can continue with the extraction of the downloaded layers.

Thus, in the bandwidth management orchestration system 400, the data collector 406 is adapted to obtain data, from the network 10 through the controller 60 and to manage data sources 404, 406. The container runtime analyzer 408 is adapted to identify images, software containers, or any other uniquely identifiable content downloaded between two points (source and destination locations) in the network 10 and to monitor for congestion associated therewith. Finally, the bandwidth orchestrator 410 is adapted to cause orchestration to mitigate the congestion marked by the container runtime analyzer 408. The orchestration can include adding bandwidth (bandwidth on demand, dynamic bandwidth allocation, etc.), prioritizing containers based on SLA policy, and/or prioritizing containers based on remaining amounts to be downloaded.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A bandwidth management method performed in a Software Defined Networking (SDN) controlled network, the bandwidth management method comprising:

responsive to detecting congestion on a network service with identifiable data therein, obtaining policy associated with the congested network service and causing bandwidth on demand in the network to mitigate the congestion when the bandwidth on demand is possible in the network and permitted based on the policy of the congested network service;

responsive to the congestion remaining subsequent to the bandwidth on demand or when the bandwidth on demand is not possible or permitted, orchestrating bandwidth for the congested network service based on the associated priority in the policy; and responsive to the congestion remaining subsequent to the orchestrating bandwidth based on priority, orchestrating bandwidth for the congested network service based on an amount remaining to download for the network service and one or more additional network services.

2. The bandwidth management method of claim 1, wherein the orchestrating bandwidth for the congested network service based on the associated priority in the policy comprises pausing lower priority Service Layer Agreement (SLA) network services in favor of higher priority SLA network services.

3. The bandwidth management method of claim 1, wherein the orchestrating bandwidth for the congested network service based on the amount remaining to download comprises pausing congested network services with greater amounts remaining to download in favor of congested network services with lesser amounts remaining to download.

4. The bandwidth management method of claim 1, wherein the bandwidth management method is performed by a bandwidth management system communicatively coupled to the SDN controller network via an SDN controller.

5. The bandwidth management method of claim 1, wherein the network service provides distribution of uniquely identifiable images or software containers between a source and destination location in the network.

6. The bandwidth management method of claim 1, wherein the network service provides distribution of uniquely identifiable content between a source and destination location in the network, wherein the uniquely identifiable content is identifiable over the network based on one of a manifest file and a hash signature.

7. The bandwidth management method of claim 1, wherein the detecting congestion is responsive to continually monitoring the network and the network service with identifiable data therein.

8. A server adapted to perform bandwidth management associated with a Software Defined Networking (SDN) controlled network, the server comprising:
a network interface communicatively coupled to an SDN controller in the network;
a processor communicatively coupled to the network interface; and
memory storing instructions that, when executed, cause the processor to
responsive to detection of congestion on a network service with identifiable data therein, obtain policy associated with the congested network service and cause bandwidth on demand in the network to mitigate the congestion when the bandwidth on demand is possible in the network and permitted based on the policy of the congested network service,
responsive to the congestion remaining subsequent to the bandwidth on demand or when the bandwidth on demand is not possible or permitted, orchestrate bandwidth for the congested network service based on the associated priority in the policy, and
responsive to the congestion remaining subsequent to the orchestrating bandwidth based on priority, orchestrate bandwidth for the congested network services based on an amount remaining to download for the network service and one or more additional network services.

9. The server of claim 8, wherein the bandwidth is orchestrated for the congested network services based on the associated priority in the policy comprises a pause for lower priority Service Layer Agreement (SLA) network services in favor of higher priority SLA network services.

10. The server of claim 8, wherein the bandwidth is orchestrated for the congested network service based on the amount remaining to download comprises a pause of congested network services with greater amounts remaining to download in favor of congested network services with lesser amounts remaining to download.

11. The server of claim 8, wherein the server is part of a bandwidth management system communicatively coupled to the SDN controlled network via an SDN controller.

12. The server of claim 8, wherein the network service provides distribution of uniquely identifiable images or software containers between a source and destination location in the network.

13. The server of claim 8, wherein the network service provides distribution of uniquely identifiable content between a source and destination location in the network, wherein the uniquely identifiable content is identifiable over the network based on one of a manifest file and a hash signature.

14. The server of claim 8, wherein the congestion is detected responsive to continual monitor of the network and the network service with identifiable data therein.

15. A bandwidth management system communicatively coupled to a Software Defined Networking (SDN) controlled network, the bandwidth management system comprising:
a data collector system adapted to obtain data from the SDN controlled network and one or more data sources;
a container runtime analyzer adapted to identify uniquely identifiable content downloaded between two points comprising source and destination locations in the network and to monitor for congestion associated therewith; and
a bandwidth orchestrator adapted to
responsive to detection of congestion on a network service, by the container runtime system, with identifiable data therein, obtain policy associated with the congested network service and cause bandwidth on demand in the network to mitigate the congestion when the bandwidth on demand is possible in the network and permitted based on the policy of the congested network service,
responsive to the congestion remaining subsequent to the bandwidth on demand or when the bandwidth on demand is not possible or permitted, orchestrate bandwidth for the congested network service based on the associated priority in the policy, and
responsive to the congestion remaining subsequent to the orchestrating bandwidth based on priority, orchestrate bandwidth for the congested network services based on an amount remaining to download for the network service and one or more additional network services.

16. The bandwidth management system of claim 15, wherein the bandwidth is orchestrated for the congested network services based on the associated priority in the policy comprises a pause for lower priority Service Layer Agreement (SLA) network services in favor of higher priority SLA network services.

17. The bandwidth management system of claim 15, wherein the data collector system is communicatively coupled to the SDN controller network via an SDN controller.

18. The bandwidth management system of claim 15, wherein the network services provide distribution of uniquely identifiable images or software containers between a source and destination location in the network.

19. The bandwidth management system of claim 15, wherein the network services provide distribution of uniquely identifiable content between a source and destination location in the network, wherein the uniquely identifiable content is identifiable over the network based on one of a manifest file and a hash signature.

20. The bandwidth management system of claim 15, wherein the container runtime analyzer is adapted to monitor continually the network and the network services with identifiable data therein to detect the congestion.

* * * * *